No. 764,377. PATENTED JULY 5, 1904.
P. G. RICHTER.
BALANCE.
APPLICATION FILED FEB. 11, 1902.
NO MODEL.

WITNESSES: INVENTOR.
P. G. Richter,
BY Carr & Carr, ATTYS.

No. 764,377.

Patented July 5, 1904.

UNITED STATES PATENT OFFICE.

PHILIPP GEORGE RICHTER, OF ST. LOUIS, MISSOURI.

BALANCE.

SPECIFICATION forming part of Letters Patent No. 764,377, dated July 5, 1904.

Application filed February 11, 1902. Serial No. 93,489. (No model.)

*To all whom it may concern:*

Be it known that I, PHILIPP GEORGE RICHTER, a citizen of the United States, and a resident of the city of St. Louis, State of Missouri, have invented a new and useful Improvement in Balances, of which the following is a specification.

My invention relates to balances, and has for its principal objects to dispense with jewels and knife-edges, to simplify and cheapen the manufacture, to secure a more rapid indication than is practicable with balances commonly used, and to provide against wear.

My invention consists principally in the arrangement and combination of parts hereinafter described and claimed.

Figure 1:
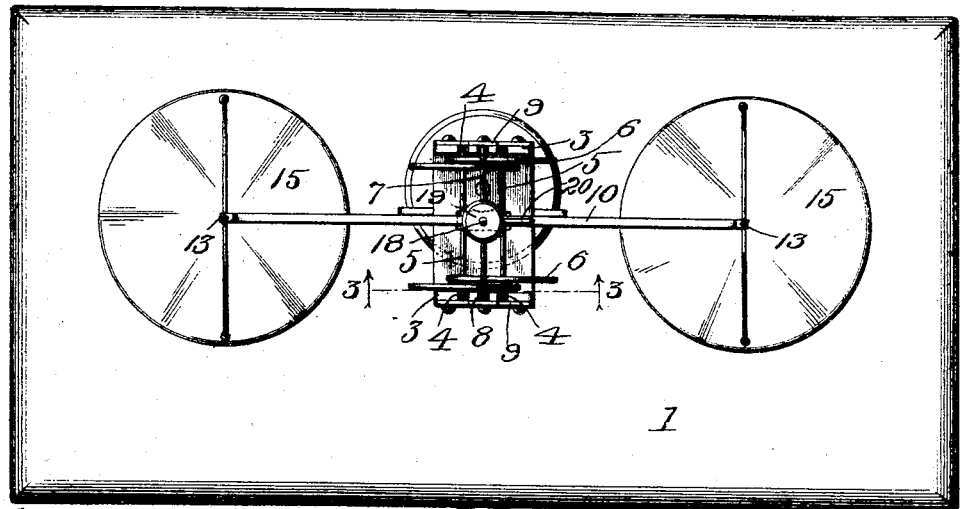
Figures 2, 3, 4:
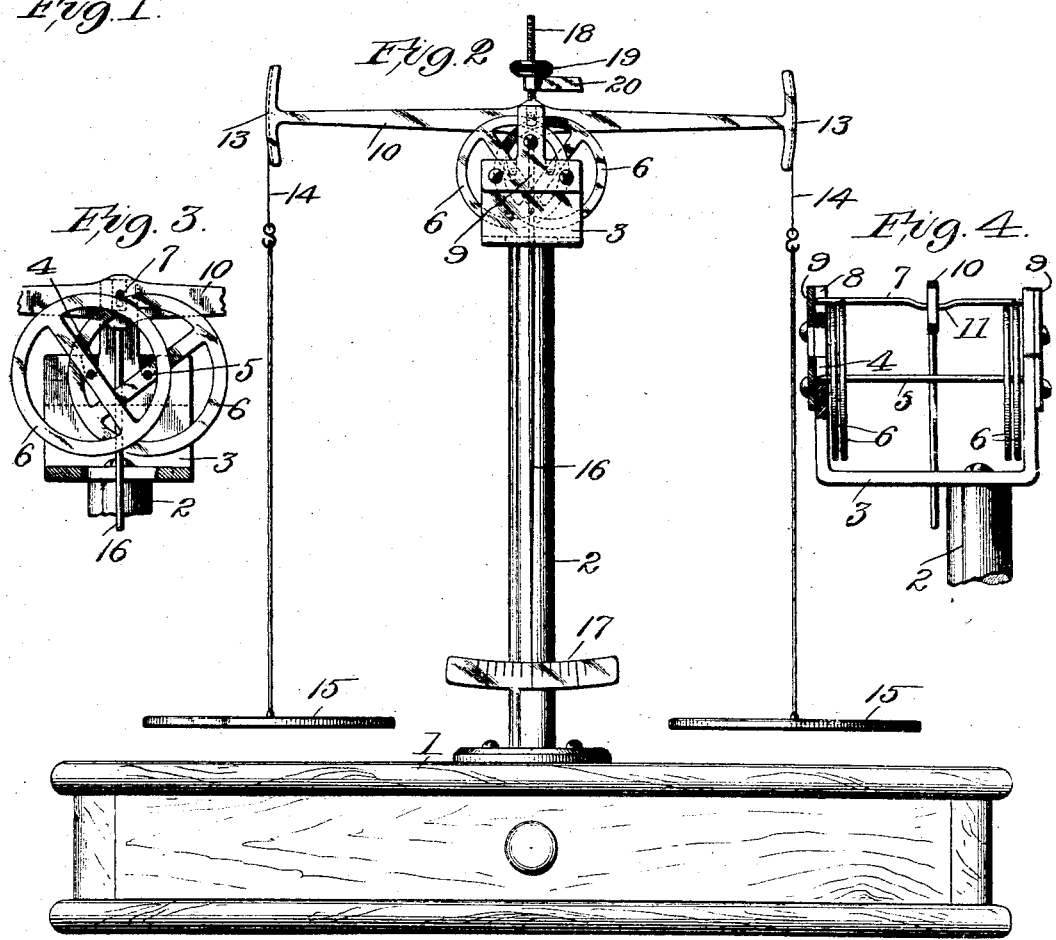

In the accompanying drawings, which form part of this specification, and wherein like symbols refer to like parts wherever they occur, Figure 1 is a plan view of my balance. Fig. 2 is a front elevation thereof. Fig. 3 is a vertical sectional detail on the line 3 3 of Fig. 1, showing the mounting of the beam. Fig. 4 is an end view of the parts shown in Fig. 3, the left branch of the yoke being shown in section.

My device comprises a base 1, upon which is fixed a column or upright tube 2, on the top of which is fixed a yoke or U-shaped plate 3. The top of each leg of this yoke has grooves or sockets 4 therein to constitute bearings for two spindles 5, journaled horizontally therein. Each of these spindles has a wheel 6 fixed thereon near each end. The wheels are all of equal size, and each wheel is so made that its center of gravity coincides accurately with its geometrical center and the spindle extends through said geometrical center. The two spindles 5 are arranged parallel to each other and at a distance apart preferably less than the radius of each wheel. In order that the spindles may be mounted closer together than the length of their radius, each wheel is made with large segmental openings arranged symmetrically therein, so that each spindle may pass through the openings in the wheels mounted on the other spindle.

Upon the top edges of the several wheels 6 rests a cylindrical spindle 7, hereinafter called the "fulcrum-spindle." The wheels 6 thus constitute a bearing for said fulcrum-spindle 7. By reason of the overlapping of adjacent wheels said spindle will slide down on the periphery of one wheel until it bears against the periphery of the other wheel and will then rest in contact with both wheels. In order to prevent the displacement of the fulcrum-spindle 7, grooves 8 are formed therefor in the tops of the two legs of the yoke 3, said grooves being wide enough to admit of slight lateral movements of the spindle and deep enough for the spindle to clear the bottoms thereof while resting upon the bearing-wheels 6. In order to prevent endwise displacement of the several spindles, end plates 9 are mounted on the yoke to cover the ends of the respective grooves, and in order to eliminate friction as far as possible the ends of the several spindles are preferably pointed.

The fulcrum-spindle 7 has a balance-beam 10 fixed thereon, the portion 11 of the spindle to which the beam is fixed being offset slightly, so as to lower the center of gravity of the beam. The beam 10 is of symmetrical shape and its geometrical center and center of gravity coincide with its axis, which is below the point of support. The end portions 13 of the beam are formed into circular arcs, to the tops of which are fastened cords 13, arranged to carry the scale-pans 14. The beam is provided with a pointer 16, arranged to traverse a scale 17, mounted on the column 2, preferably near the bottom thereof. The top of the beam is also provided with a screw 18, upon which works a threaded nut 19, which carries a winged nut or flag 20, whereby a slight inaccuracy in the balance may be readily compensated for.

The principal advantages of my invention are the simplicity and cheapness of its manufacture, and the facility with which the bearing-surface may be changed before there is any appreciable wear, and the strength of all parts in comparison with the corresponding parts of other balances of the same sensitiveness, and the rapidity with which it indicates the true weight as compared with other balances of equal sensitiveness.

While the circular arcs at the ends of the beam involve a change of the moment-arm or leverage of a small portion of the cord and arc and require the scale to be made empirically, this disadvantage is more than offset by the fact that the vertical movement of the weight does not involve any horizontal movement, and consequently the balance may be used for special purposes where horizontal movement is not permissible.

What I claim is—

1. A balance comprising a column having a yoke thereon and grooves in said yoke, two parallel spindles journaled in said grooves, two wheels upon each of said spindles, the wheels upon one spindle overlapping the wheels upon the other spindle, and a beam having a fulcrum-spindle resting upon said wheels, the said beam lying between the wheels on either spindle.

2. A balance comprising a column having a yoke thereon and grooves in said yoke, parallel spindles journaled in said grooves, overlapping wheels mounted on said spindles and having segmental openings therein, each of said spindles extending through the segmental openings of the wheels on the other fulcrum-spindle, and a beam having a spindle resting on said wheels, substantially as described.

3. A balance comprising two parallel spindles journaled horizontally and having overlapping wheels thereon, and a fulcrum-spindle resting on said wheels and having an offset portion, and a beam mounted on said offset portion, substantially as described.

4. A balance comprising a column having a yoke thereon and grooves in said yoke, parallel spindles journaled horizontally in said grooves, overlapping wheels on said spindles, and a fulcrum-spindle resting on said wheels and having an offset portion, and a beam mounted on said offset portion, substantially as described.

5. A balance comprising two parallel spindles journaled horizontally and having overlapping wheels thereon, said wheels having segmental openings therein, and said spindles extending through said openings, a fulcrum-spindle resting on said wheels and a beam mounted on said last-mentioned spindle, substantially as described.

6. A balance comprising a column having a yoke thereon and grooves in said yoke, two parallel spindles journaled in said grooves, two wheels upon each of said spindles, the wheels upon one spindle overlapping the wheels upon the other spindle, a fulcrum-spindle resting on said wheels and having an offset portion and a beam mounted on said offset portion, the said beam lying between the wheels upon either spindle.

St. Louis, Missouri, February 8, 1902.

PHILIPP GEORGE RICHTER.

In presence of—
JAMES A. CARR,
ZOLA TUCKER.